March 11, 1924.
T. J. PEDERSEN
COLLAPSIBLE FISH TRAP
Filed April 11, 1923
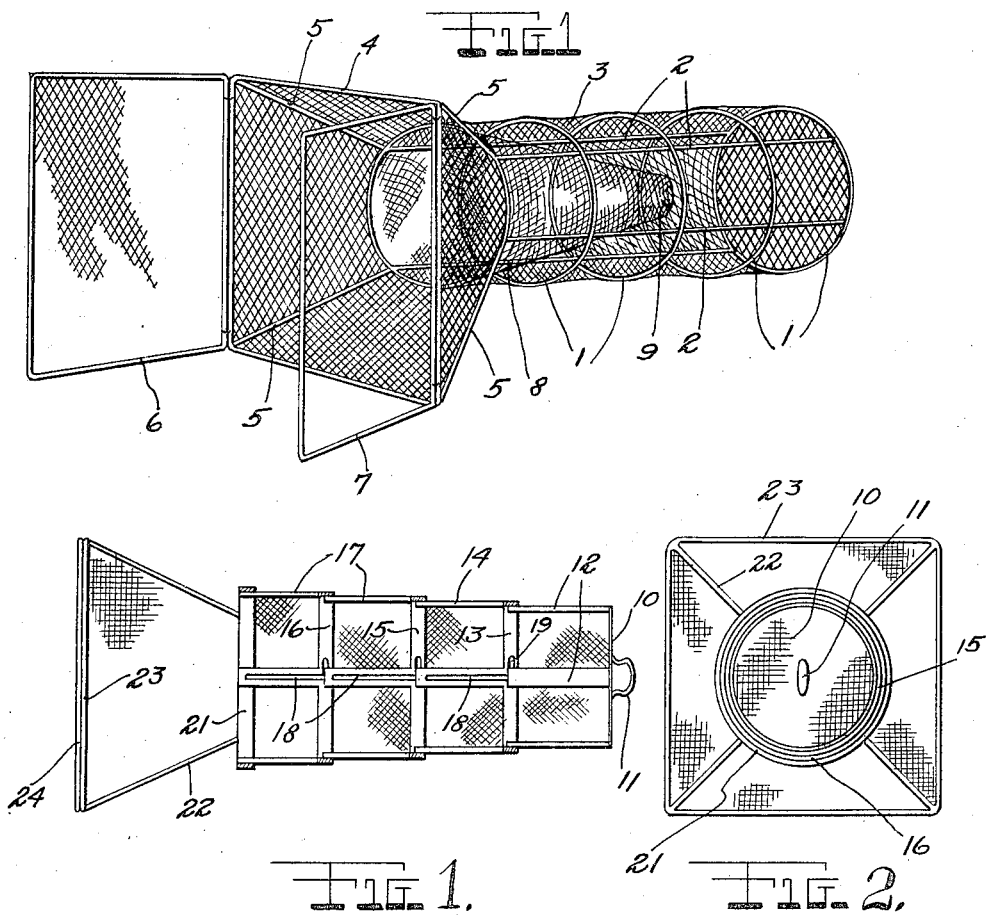
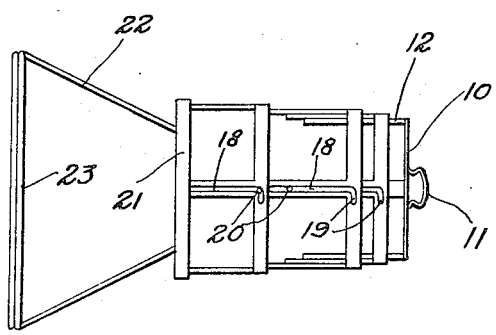
INVENTOR
T. J. Pedersen
BY
ATTORNEY Patented Mar. 11, 1924.

1,486,390

UNITED STATES PATENT OFFICE.

TROELS J. PEDERSEN, OF JERSEY CITY, NEW JERSEY.

COLLAPSIBLE FISH TRAP.

Application filed April 11, 1923. Serial No. 631,253.

*To all whom it may concern:*

Be it known that I, TROELS J. PEDERSEN, a citizen of Denmark, residing at Jersey City, in the county of Hudson and State of New Jersey, have invented certain new and useful Improvements in Collapsible Fish Traps, of which the following is a specification.

This invention relates to fishing apparatus and the main object is to provide a device which is submerged for the purpose of enticing fish into its confines without injuring the same.

Another object is to provide a trap having a plurality of circular frame sections which telescope successively one into the other, in such manner as to take up a minimum of space when not in use.

These and other objects will become apparent in the description below, in which characters of reference refer to like-named parts in the drawing.

Referring briefly to the drawing,

Figure 1 is a sectional elevational view of the fish trap, showing the cage completely extended.

Figure 2 is a rear elevational view of Figure 1.

Figure 3 is an elevational view similar to Figure 1, showing the cage frame partly telescoped.

Referring in detail to the drawing, the numeral 10 indicates a flat annular plate located on the smaller and end cage upon which a handle 11 is mounted. The cage is comprised of a series of sections of which one is slidable into the adjacent section. The funnel usually provided in fish traps is omitted from these views for the sake of clarity and to better illustrate the telescoping functions of the cage sections. A plurality of legs 12 project from one side of the plate 10 at spaced apart intervals. Annular straps 15 and 16 are each provided with a plurality of legs 17, the strap 15 being of smaller diameter than the strap 16 in order to be readily slidable into the last-named strap. A similar annular strap 13 having legs 14 thereon, provides the intermediate cage section and is slidable into strap 15. The legs forming parts of the straps 13, 15, and 16, are provided with longitudinal slots 18, the purpose of which will be more fully hereinafter described. At the strap end of each slot is an angular continuation 19 of the same, which communicates therewith and forms a so-called bayonet slot. The ends of the legs 13, 15, and 12, have each a pin projecting from the face thereof, said pin being slidably engaged in the slot 18 of the corresponding leg of the adjacent strap. The ends of the legs 17 on the straps which project from member 16, are rigidly secured to a hoop 21. Bar members 22 extend radially downward from the last named hoop, the ends of said bars being rigidly attached to the rectangular frame 23, as shown in Figure 2.

In using a trap of this type, cord lines are attached at advantageous places and it may then be lowered into the water. The lines are attached to the trap in such manner as to lower the device in tilted position and with the rectangular frame lowermost. The trap is preferably used completely submerged, the usual procedure being to allow the same to rest upon the water bed. The fish will pass thru the funnel and enter into the confined portion formed by the hoop. The principle by which fish are trapped in this manner is obvious and the description therefore is believed unnecessary.

One of the main purposes of the device as shown in the several views, is to provide a trap which may be readily collapsed when not in use so that the same will require a minimum of space in storage. In order to collapse the cage, the handle 11 is grasped and the smallest cage section is rotated in the direction of the lock slots, and the pins 20 leave the bayonet slots 19 and enter into the lock slots 18. From this description it is obvious that the angular slots 19 lock the cage sections in fully extended position when the pins 20 are engaged therein.

I claim—

1. A device of the class described comprising a plurality of annular straps, legs extending from said straps, the legs of one member being adapted to telescope into the strap of the adjacent member, means for slidably guiding said legs into the strap of the adjacent member, and pins engaged in said guide means for locking the legs in extended position.

2. A device of the class described comprising a plurality of vari-sized annular straps, one being adapted to telescope into its adjacent strap, a cover plate on the smallest strap, legs on said straps having longitudinal slots traversing their length, pins on the ends of said legs adapted to engage the slots of the adjacent legs, said straps having angular slots communicating with the corresponding slots in the legs, said pins when engaging the angular slots being adapted to retain the strap sections in extended position.

In testimony whereof I affix my signature.

TROELS J. PEDERSEN.